(12) United States Patent
Davis

(10) Patent No.: US 10,477,845 B1
(45) Date of Patent: Nov. 19, 2019

(54) SNAG-RESISTANT FISHING LURE

(71) Applicant: BLADEMAN, LLC, Rock Hill, SC (US)

(72) Inventor: James Ronald Davis, Rock Hill, SC (US)

(73) Assignee: BLADEMAN, LLC, Rock Hill, SC (US)

( * ) Notice: Subject to any disclaimer, the term of this patent is extended or adjusted under 35 U.S.C. 154(b) by 0 days.

(21) Appl. No.: 16/032,034

(22) Filed: Jul. 10, 2018

(51) Int. Cl.
    *A01K 85/00* (2006.01)
    *A01K 85/14* (2006.01)
    *A01K 85/18* (2006.01)
    *A01K 85/02* (2006.01)

(52) U.S. Cl.
    CPC .............. *A01K 85/02* (2013.01); *A01K 85/00* (2013.01); *A01K 85/14* (2013.01); *A01K 85/18* (2013.01)

(58) Field of Classification Search
    CPC ........ A01K 85/00; A01K 85/18; A01K 85/14; A01K 91/03; A01K 91/04
    USPC ........... 43/42.47, 42.39, 42.22, 42.23, 42.24, 43/42.28, 42.15, 42.18, 42.4, 42.42, 42.5, 43/42.52, 42.03, 42.09, 43.1
    See application file for complete search history.

(56) References Cited

U.S. PATENT DOCUMENTS

| | | | | |
|---|---|---|---|---|
| 895,493 A | * | 8/1908 | O'Brien ................. | A01K 91/04 43/44.83 |
| 1,297,617 A | * | 3/1919 | Welles .................... | A01K 85/18 43/42.15 |
| 1,333,154 A | * | 3/1920 | Buddle .................. | A01K 85/02 43/42.23 |
| 1,418,229 A | * | 5/1922 | Buddle .................. | A01K 85/14 43/42.18 |
| 1,421,991 A | | 7/1922 | Rodgers et al. | |
| 1,644,151 A | * | 10/1927 | Rodgers ................. | A01K 85/16 43/42.24 |
| 1,833,581 A | | 11/1931 | Jordan | |
| 1,910,742 A | | 5/1933 | Binns | |
| 1,928,367 A | | 9/1933 | Buddle | |
| 1,934,158 A | | 11/1933 | Charles | |
| 1,994,678 A | * | 3/1935 | Yarvise .................. | A01K 85/00 43/42.15 |

(Continued)

FOREIGN PATENT DOCUMENTS

| | | | | |
|---|---|---|---|---|
| JP | | 10028492 A | * | 2/1998 |
| JP | | 2012147701 A | * | 8/2012 |

(Continued)

*Primary Examiner* — Darren W Ark
(74) *Attorney, Agent, or Firm* — Charlotte C. Wilson

(57) ABSTRACT

A fishing lure includes a jig having a body, a hook, and a blade attached to the body at two attachment points. The hook extends along a longitudinal axis of the body. A fixed wire loop extends from a forward end of the body along the longitudinal axis to directly connect the blade to the body. The blade has an edge near the body, a first attachment hole through the blade near the first edge, a second attachment hole aligned with and spaced near the first attachment hole, and a pair of line attachment holes spaced apart from the second attachment hole. The wire loop is fed directly through both the first and the second attachment holes, and the first edge is outside the wire loop. This arrangement controls the jig body's movement relative to the blade, reducing the likelihood of rollover that could lead to snagging.

13 Claims, 16 Drawing Sheets

(56) References Cited

U.S. PATENT DOCUMENTS

| | | | |
|---|---|---|---|
| 1,997,900 A * | 4/1935 | Edwards | A01K 85/16 43/42.15 |
| 2,032,819 A | 3/1936 | Louis | |
| 2,051,978 A | 8/1936 | Accetta | |
| 2,119,805 A | 6/1938 | Davenport | |
| 2,205,472 A | 6/1940 | Fagerholm | |
| 2,228,513 A * | 1/1941 | Frisbie | A01K 95/00 43/42.09 |
| 2,246,850 A | 6/1941 | Housberg | |
| 2,291,422 A * | 7/1942 | Thomas | A01K 85/14 43/42.18 |
| D143,531 S * | 1/1946 | Harris | 43/43.1 |
| 2,463,889 A | 3/1949 | Lundemo | |
| 2,507,908 A | 5/1950 | Kaste | |
| 2,523,536 A | 9/1950 | Maddux | |
| 2,523,831 A | 9/1950 | Koski | |
| 2,523,949 A | 9/1950 | Milton | |
| 2,555,435 A | 6/1951 | Caen | |
| 2,559,542 A | 7/1951 | Corban | |
| 2,566,029 A | 8/1951 | Louthan | |
| 2,570,338 A * | 10/1951 | Gambill | A01K 85/16 43/42.35 |
| 2,588,055 A | 3/1952 | Smith | |
| 2,618,096 A * | 11/1952 | Wagner | A01K 85/16 43/42.09 |
| 2,693,048 A | 11/1954 | Ansley | |
| 2,700,240 A | 1/1955 | Gibbs | |
| 2,714,273 A | 8/1955 | Torrance | |
| 2,741,863 A | 4/1956 | John | |
| 2,799,113 A | 7/1957 | Gonzales | |
| 2,799,133 A | 7/1957 | Rose | |
| 2,805,512 A | 9/1957 | Bunce | |
| 2,817,921 A | 12/1957 | Stanley | |
| 2,851,815 A | 9/1958 | Warner | |
| 2,871,540 A * | 2/1959 | Smith | A01K 91/04 24/600.9 |
| 2,886,914 A | 5/1959 | Lievense | |
| 2,948,984 A * | 8/1960 | Crawford | A01K 85/14 43/42.39 |
| 2,989,817 A | 6/1961 | Kepler | |
| 3,012,356 A | 12/1961 | Youree | |
| 3,040,466 A | 6/1962 | Jablonski | |
| 3,090,152 A | 5/1963 | Helin | |
| 3,128,572 A | 4/1964 | Raymon | |
| 3,131,504 A | 5/1964 | Haulk | |
| 3,174,248 A * | 3/1965 | Hagel | A01K 85/16 43/42.09 |
| 3,187,457 A | 6/1965 | Karisch | |
| 3,192,660 A | 7/1965 | Guess | |
| 3,229,407 A | 1/1966 | Quyle | |
| 3,241,261 A * | 3/1966 | Ament | A01K 85/14 43/42.15 |
| 3,248,820 A * | 5/1966 | Lamar | A01K 85/00 43/42.23 |
| 3,277,549 A * | 10/1966 | Bradshaw | A01K 91/04 24/601.1 |
| 3,293,790 A * | 12/1966 | Konomos | A01K 83/06 43/42.15 |
| 3,344,549 A | 10/1967 | Peters et al. | |
| 3,401,483 A | 9/1968 | Bellah et al. | |
| 3,405,475 A * | 10/1968 | Ross | A01K 85/00 43/42.08 |
| 3,541,718 A * | 11/1970 | Norman | A01K 85/16 43/42.35 |
| 3,543,431 A | 12/1970 | Olds | |
| 3,579,892 A | 5/1971 | Olvey, Sr. | |
| 3,667,148 A | 6/1972 | Dawson | |
| 3,708,904 A | 1/1973 | Zaharis | |
| 3,729,850 A | 5/1973 | Waters, Jr. | |
| 3,731,419 A | 5/1973 | Candy | |
| 3,753,310 A * | 8/1973 | Werner | A01K 85/16 43/42.39 |
| 3,863,382 A | 2/1975 | Heili | |
| 3,902,267 A | 9/1975 | Monchil | |
| 3,971,154 A | 7/1976 | Craig | |
| 3,996,688 A * | 12/1976 | Hardwicke, III | A01K 85/00 43/42.09 |
| 4,035,945 A | 7/1977 | Newman | |
| 4,044,491 A | 8/1977 | Potter | |
| 4,142,318 A | 3/1979 | Morrell | |
| 4,142,319 A * | 3/1979 | Mihaljevic | A01K 85/14 43/42.39 |
| 4,201,006 A | 5/1980 | Wetherald | |
| 4,320,592 A | 3/1982 | Kirsch | |
| 4,453,333 A * | 6/1984 | Olson | A01K 85/00 43/42.23 |
| 4,641,455 A | 2/1987 | Johnson | |
| 4,658,535 A | 4/1987 | Anderson | |
| 4,660,318 A | 4/1987 | Mieno | |
| 4,738,047 A | 4/1988 | Ryan | |
| 4,747,228 A | 5/1988 | Giovengo, Jr. | |
| 4,769,940 A | 9/1988 | Doss | |
| 4,773,180 A | 9/1988 | Shimizu | |
| 4,777,761 A | 10/1988 | Renaud | |
| 4,815,229 A | 3/1989 | Nicholson, III | |
| 4,862,629 A | 9/1989 | Ryan | |
| 4,864,766 A | 9/1989 | Bohn | |
| 5,020,267 A | 6/1991 | Rasmussen | |
| 5,113,615 A | 5/1992 | Drachkovitch | |
| 5,150,538 A | 9/1992 | Buchanan | |
| 5,157,859 A | 10/1992 | Wirkus | |
| 5,216,830 A | 6/1993 | Brott, II | |
| 5,337,508 A | 8/1994 | Pfeiffer | |
| 5,461,819 A | 10/1995 | Shindledecker | |
| 5,666,760 A * | 9/1997 | Bramblett | A01K 91/04 24/908 |
| 5,822,914 A | 10/1998 | Tadych | |
| 5,857,283 A * | 1/1999 | Perrick | A01K 85/08 43/42.28 |
| 5,887,378 A * | 3/1999 | Rhoten | A01K 85/14 43/42.03 |
| 5,918,406 A * | 7/1999 | Wilson | A01K 85/00 43/42.15 |
| 5,937,569 A | 8/1999 | Solheim | |
| 5,974,723 A | 11/1999 | Taibi | |
| 5,983,554 A | 11/1999 | Storey | |
| 6,018,903 A | 2/2000 | Miralles | |
| 6,044,582 A * | 4/2000 | Johnson | A01K 61/90 223/103 |
| 6,226,917 B1 * | 5/2001 | Sylla | A01K 85/00 43/17.6 |
| 6,269,583 B1 | 8/2001 | Tashchyan | |
| 6,484,434 B1 | 11/2002 | Elges | |
| 6,581,321 B2 | 6/2003 | Tashchyan | |
| 6,618,979 B2 | 9/2003 | Wacha | |
| 6,772,553 B2 | 8/2004 | Phillips et al. | |
| 6,813,857 B2 | 11/2004 | Payer | |
| 7,028,430 B2 | 4/2006 | Gironda | |
| 7,107,718 B1 | 9/2006 | Alajajyan | |
| 7,197,846 B1 | 4/2007 | Gibson | |
| 7,415,793 B1 | 8/2008 | Borchardt | |
| 7,444,778 B2 | 11/2008 | Snowberger | |
| 7,493,724 B1 | 2/2009 | Peterson | |
| 7,621,068 B1 * | 11/2009 | Renosky | A01K 85/01 43/42.03 |
| 7,627,978 B2 | 12/2009 | Davis | |
| 7,726,062 B2 * | 6/2010 | Davis | A01K 85/02 43/42.03 |
| 7,950,180 B2 * | 5/2011 | Hatfield | A01K 85/00 43/17.2 |
| 8,156,682 B2 | 4/2012 | Dahlberg | |
| 8,196,337 B2 | 6/2012 | Simmons | |
| 8,429,847 B2 | 4/2013 | Ford | |
| 8,468,737 B2 | 6/2013 | Simmons | |
| 8,656,633 B2 * | 2/2014 | Renosky | A01K 85/00 43/42.22 |
| 8,733,012 B2 * | 5/2014 | Thorne | A01K 85/14 43/42.24 |
| 8,739,460 B2 | 6/2014 | Thorne | |
| 8,782,945 B2 | 7/2014 | Jones | |
| 8,806,802 B2 | 8/2014 | Jones | |
| 8,844,190 B2 | 9/2014 | Comeaux | |

(56) References Cited

U.S. PATENT DOCUMENTS

| | | | |
|---|---|---|---|
| 8,919,033 B2 * | 12/2014 | Davis | A01K 85/14 |
| | | | 43/42.03 |
| 8,973,298 B2 * | 3/2015 | Thorne | A01K 85/00 |
| | | | 43/42.15 |
| 9,072,285 B1 | 7/2015 | Rye | |
| 9,089,120 B2 * | 7/2015 | Davis | A01K 91/04 |
| 9,161,521 B2 * | 10/2015 | Thorne | A01K 85/14 |
| 9,253,967 B2 * | 2/2016 | Davis | A01K 85/02 |
| 9,265,239 B2 | 2/2016 | Ford | |
| D760,866 S * | 7/2016 | Monteleone | D22/134 |
| 9,485,975 B1 | 11/2016 | Rye | |
| 9,622,461 B2 | 4/2017 | Vashina | |
| 9,700,028 B2 | 7/2017 | Ulyanov | |
| D809,623 S * | 2/2018 | Schneider | D22/134 |
| D836,750 S * | 12/2018 | Baskett | D22/144 |
| 2001/0045048 A1 | 11/2001 | Johnson | |
| 2003/0074830 A1 | 4/2003 | Goeke | |
| 2005/0086849 A1 * | 4/2005 | Perrick | A01K 85/00 |
| | | | 43/42.47 |
| 2005/0246940 A1 | 11/2005 | Jones et al. | |
| 2006/0053680 A1 | 3/2006 | Petitjean | |
| 2006/0185221 A1 * | 8/2006 | Burns | A01K 83/00 |
| | | | 43/44.83 |
| 2006/0191186 A1 | 8/2006 | Perrick | |
| 2008/0127541 A1 * | 6/2008 | Shelton | A01K 85/00 |
| | | | 43/42.13 |
| 2008/0172924 A1 * | 7/2008 | Thorne | A01K 85/00 |
| | | | 43/42.47 |
| 2008/0172925 A1 | 7/2008 | Hazel | |
| 2008/0263935 A1 * | 10/2008 | Albrecht | A01K 85/00 |
| | | | 43/42.13 |
| 2010/0325939 A1 * | 12/2010 | Frayne | A01K 83/00 |
| | | | 43/44.83 |
| 2013/0047491 A1 | 2/2013 | Davis | |
| 2013/0247444 A1 * | 9/2013 | Young | A01K 85/00 |
| | | | 43/42.09 |
| 2014/0237889 A1 * | 8/2014 | Tamburro | A01K 85/00 |
| | | | 43/42.09 |
| 2015/0007483 A1 | 1/2015 | Thorne | |
| 2016/0106081 A1 * | 4/2016 | Thorne | A01K 85/18 |
| | | | 43/42.39 |
| 2016/0235049 A1 * | 8/2016 | Thorne | A01K 91/04 |
| 2016/0338329 A1 * | 11/2016 | Thorne | A01K 85/18 |
| 2017/0099822 A1 * | 4/2017 | Thorne | A01K 85/12 |
| 2018/0310538 A1 * | 11/2018 | Supinski | A01K 85/14 |
| 2019/0029239 A1 * | 1/2019 | Schwartz | A01K 85/14 |
| 2019/0045764 A1 * | 2/2019 | Gibson | A01K 85/18 |
| 2019/0133099 A1 * | 5/2019 | Ostruszka | A01K 85/14 |

FOREIGN PATENT DOCUMENTS

| | | | | |
|---|---|---|---|---|
| JP | 2013106560 A | * | 6/2013 | |
| JP | 2016140350 A | * | 8/2016 | |
| JP | 2018023337 A | * | 2/2018 | |

* cited by examiner

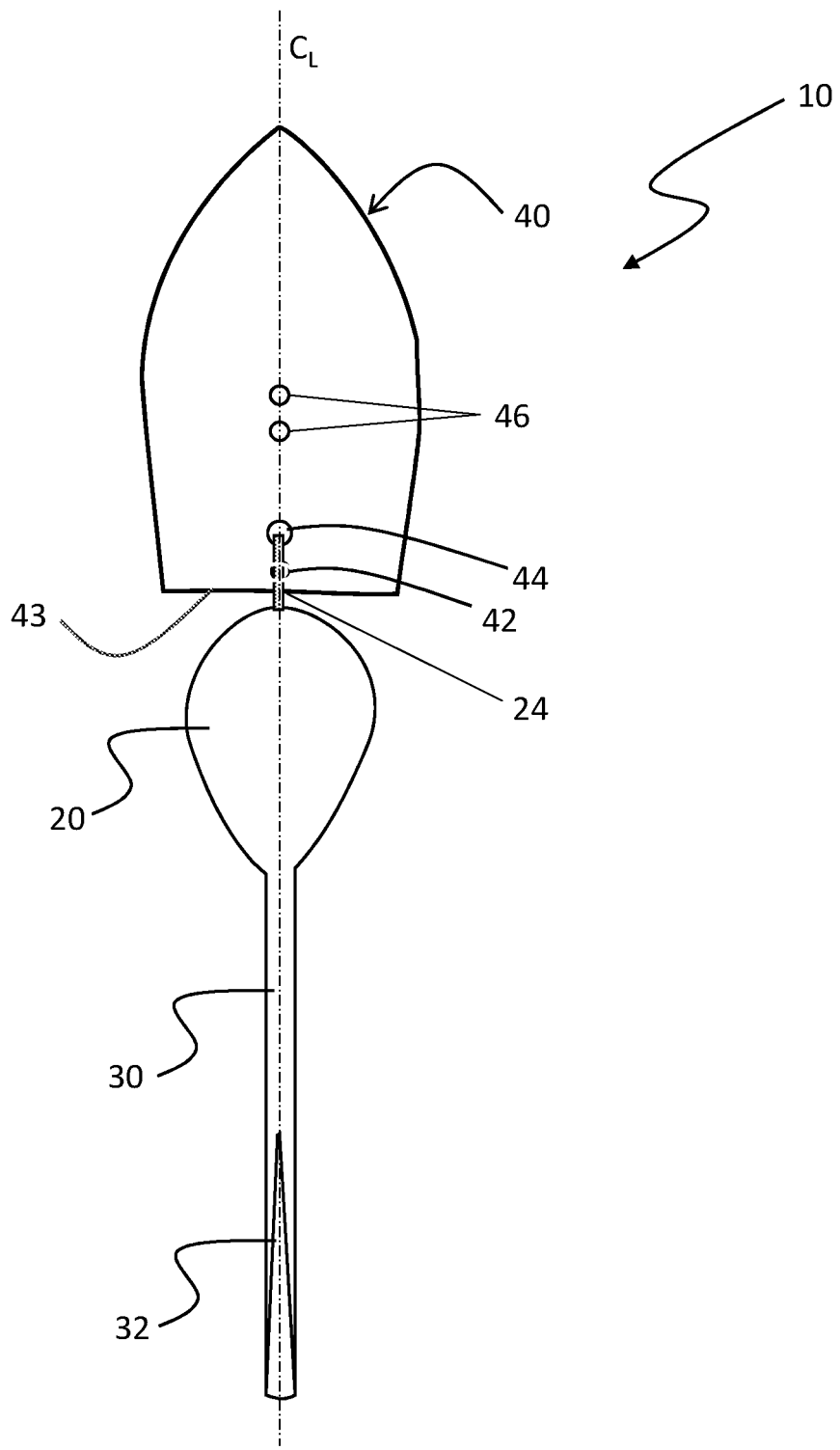
—FIG. 1—

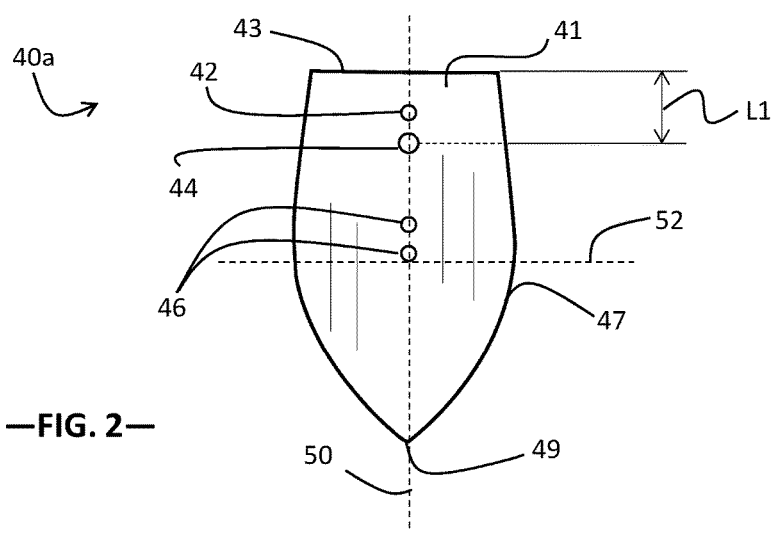
—FIG. 2—
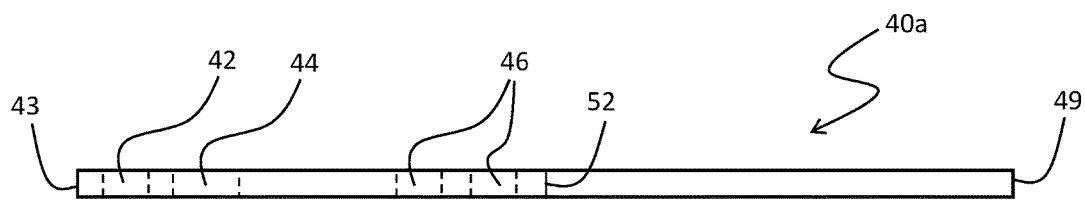
—FIG. 3—

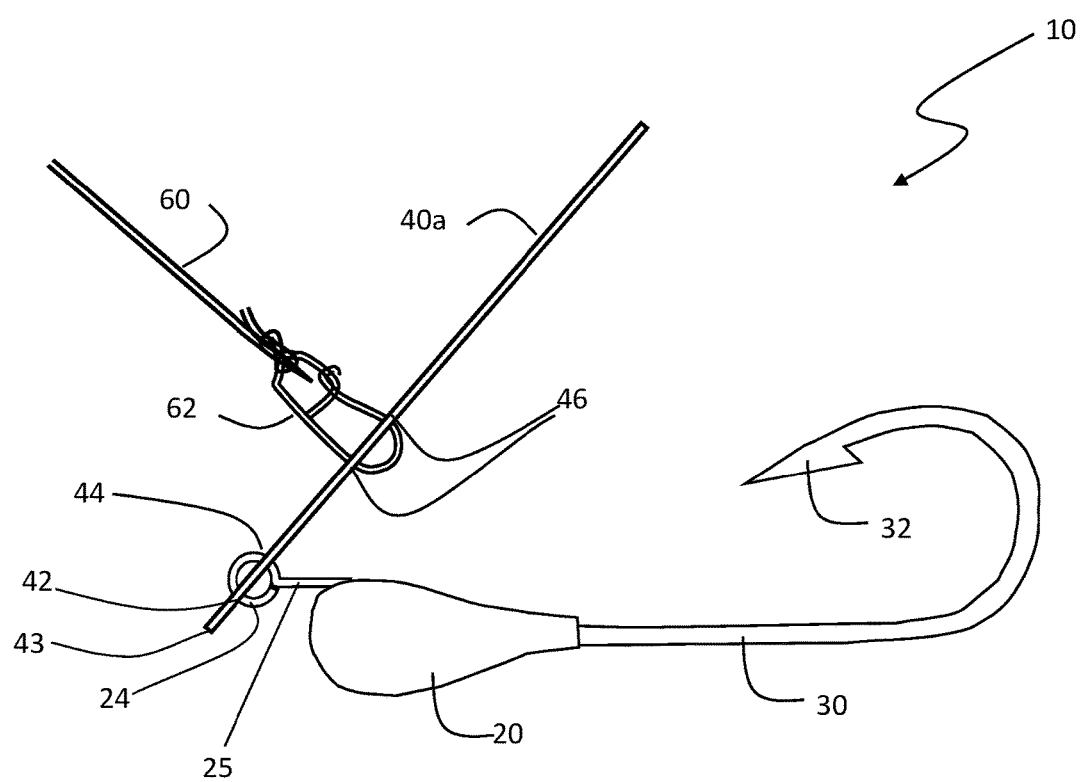
—FIG. 4—

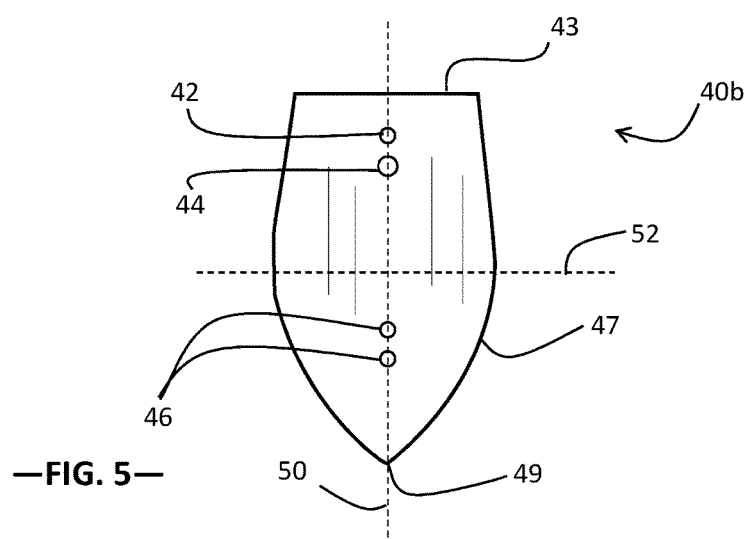
—FIG. 5—
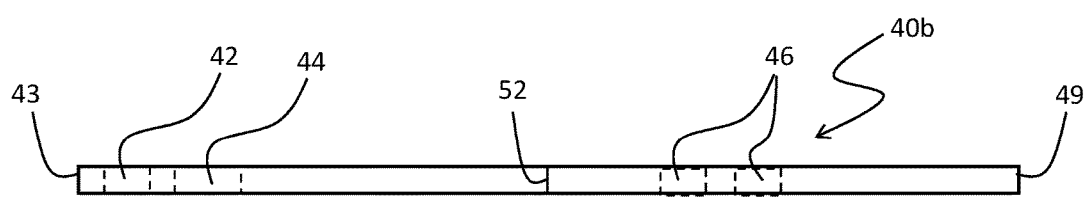
—FIG. 6—

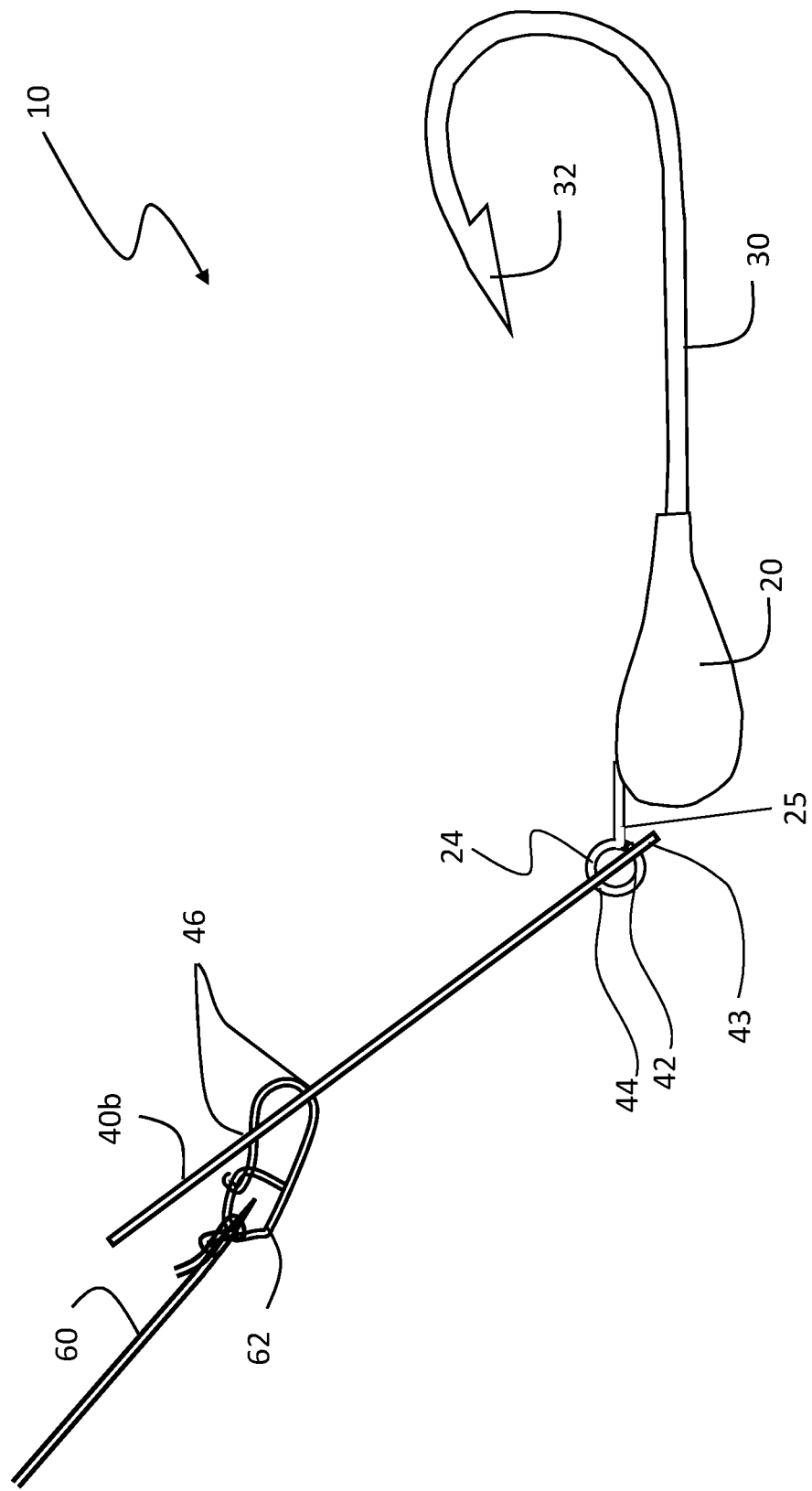
—FIG. 7—

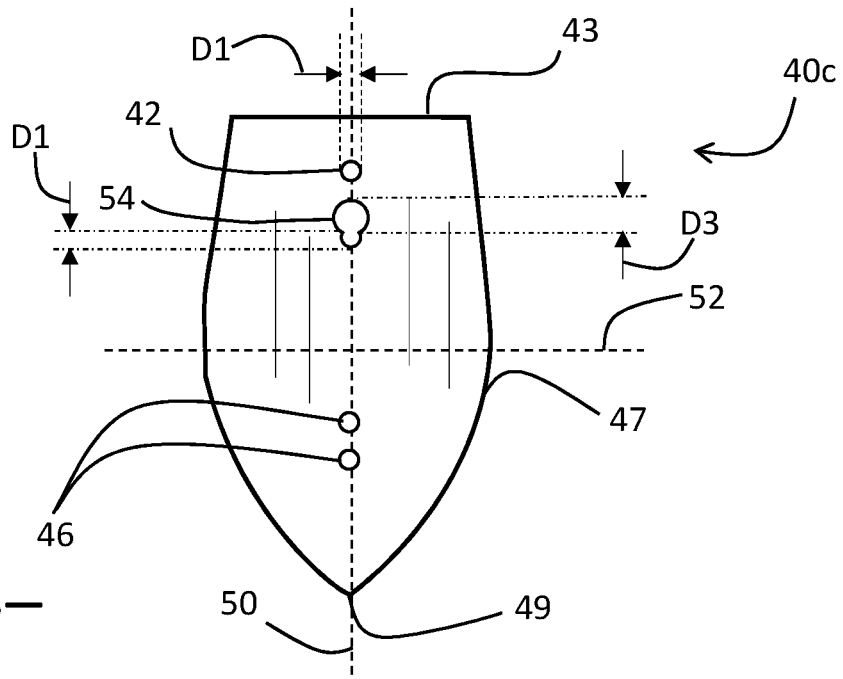
—FIG. 8—
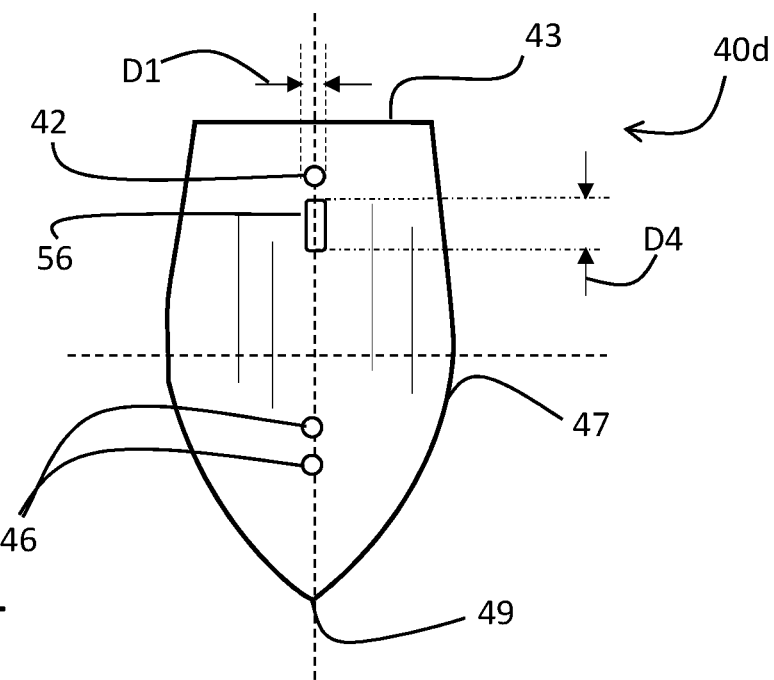
—FIG. 9—

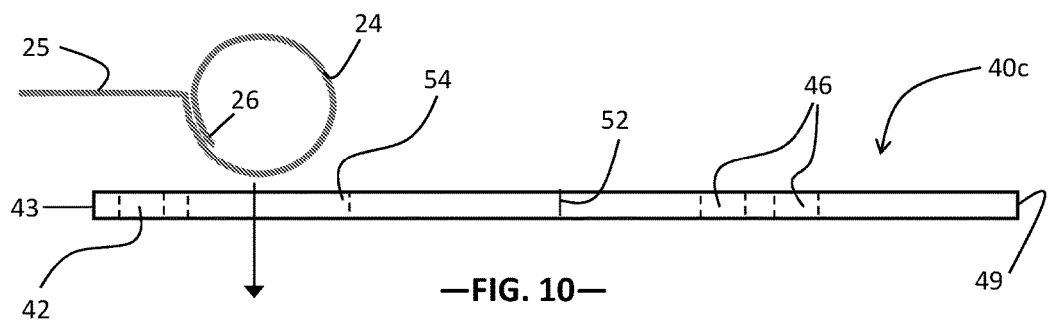
—FIG. 10—
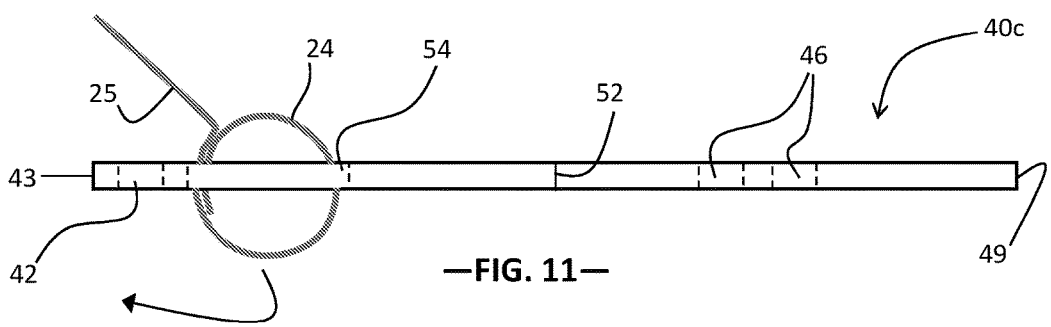
—FIG. 11—
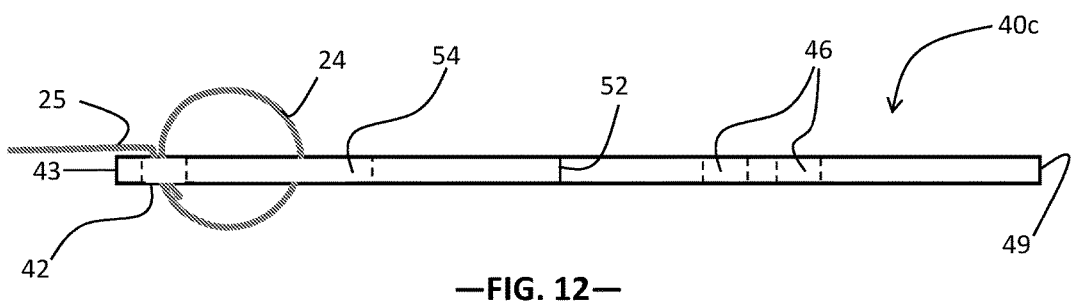
—FIG. 12—

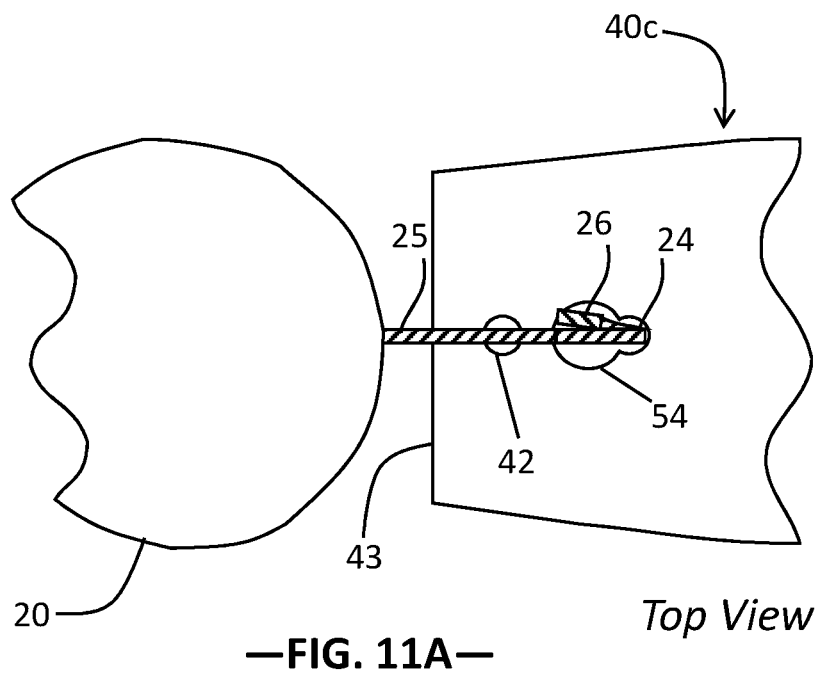
—FIG. 11A—
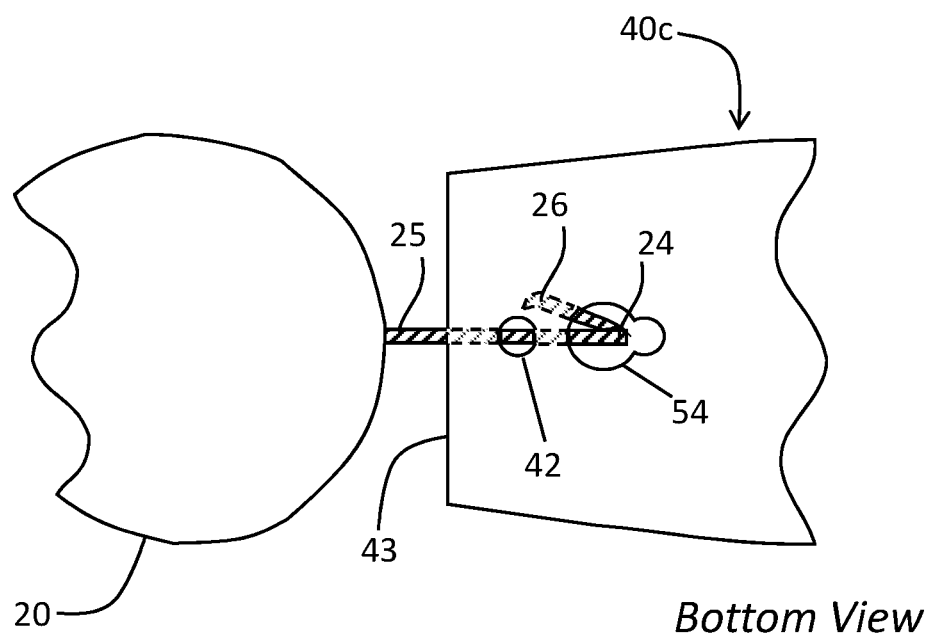
—FIG. 11B—

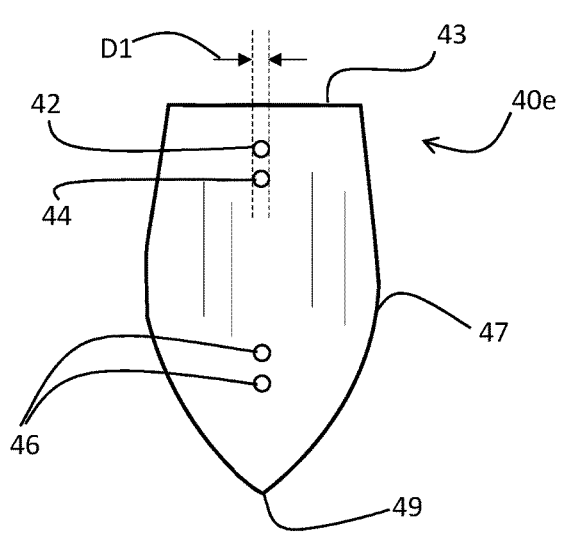
—FIG. 13—
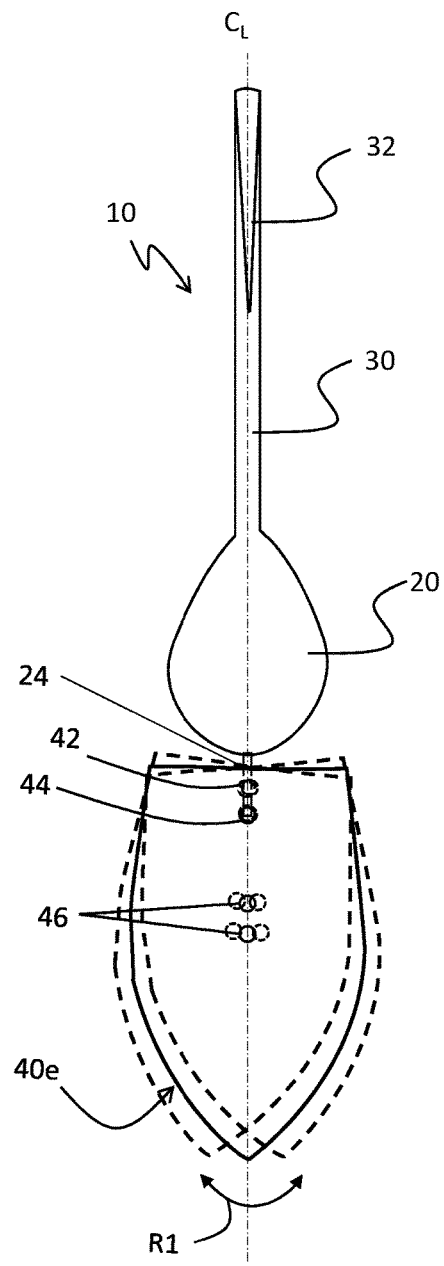
—FIG. 14—

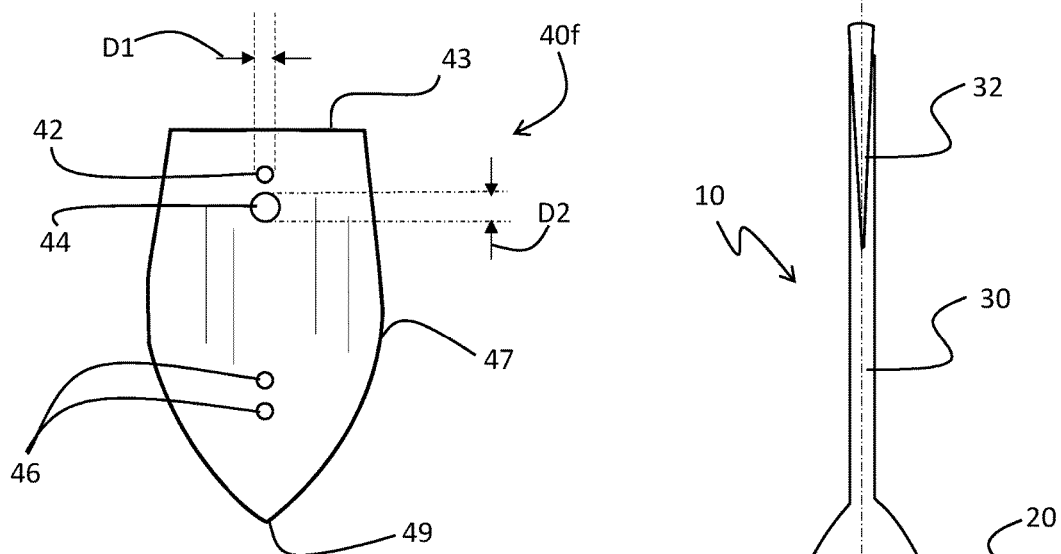
—FIG. 15—
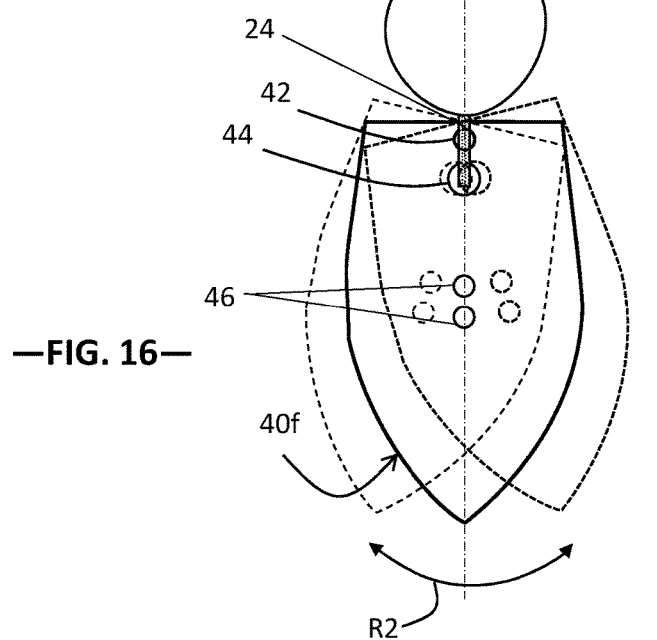
—FIG. 16—

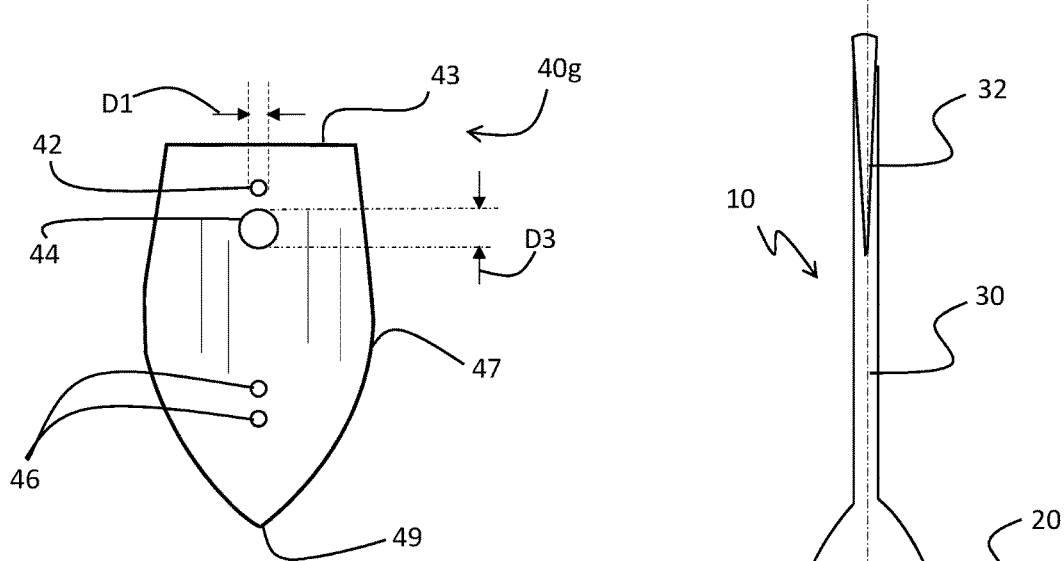
—FIG. 17—
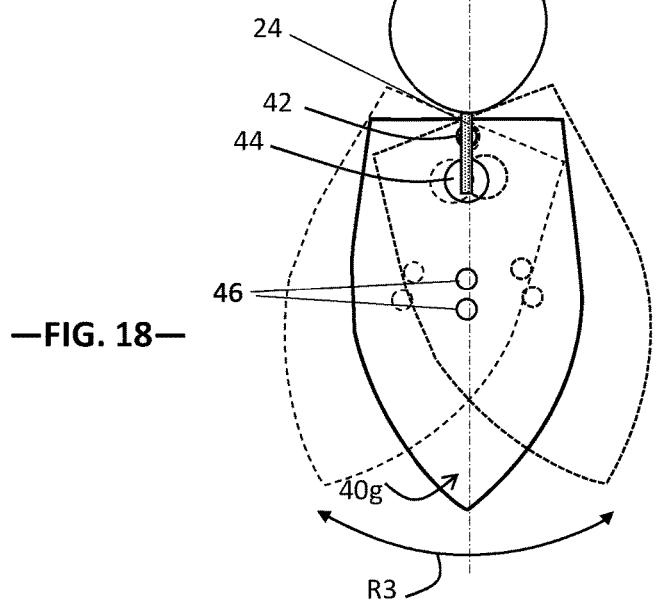
—FIG. 18—

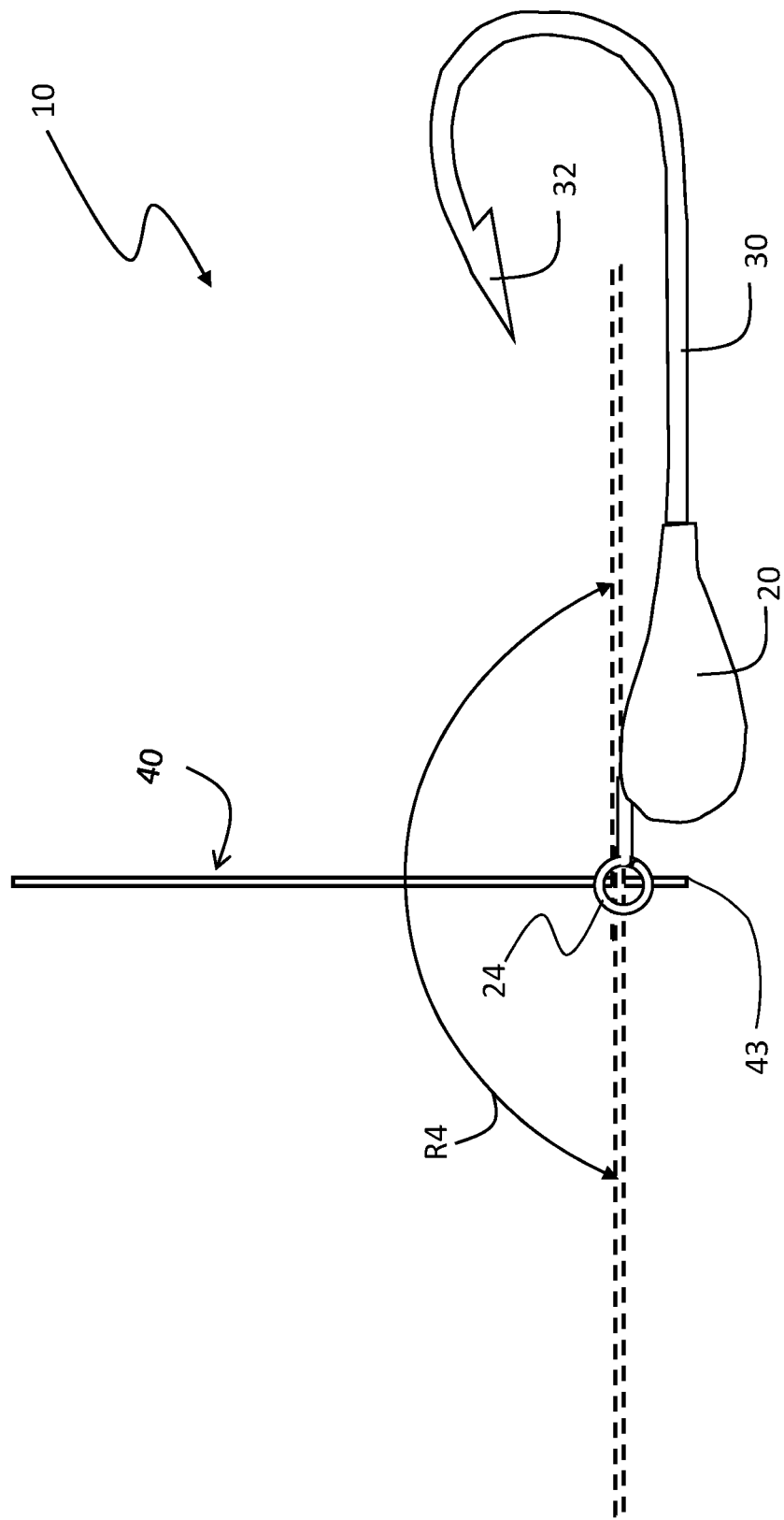
— FIG. 19 —

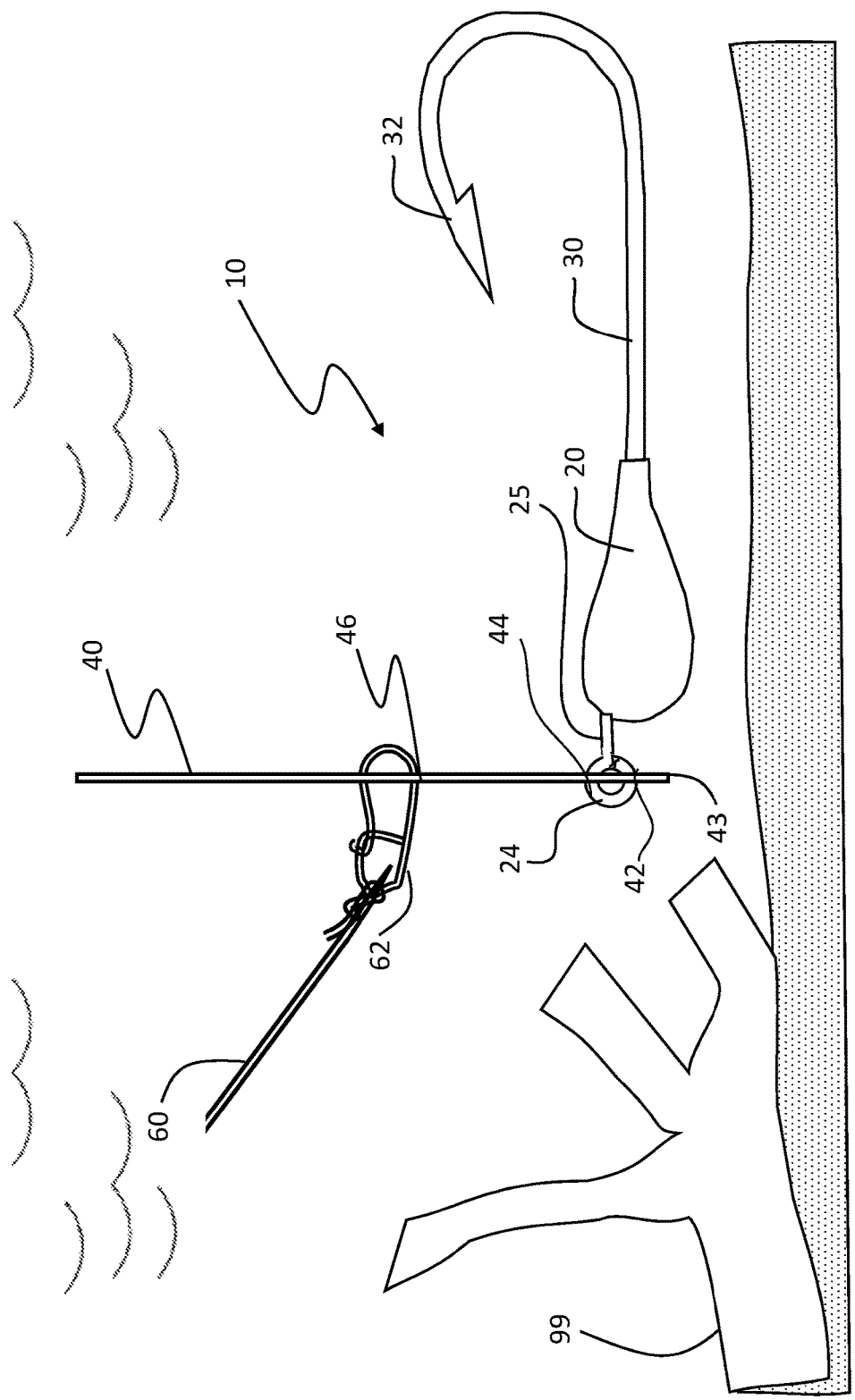
—FIG. 20—

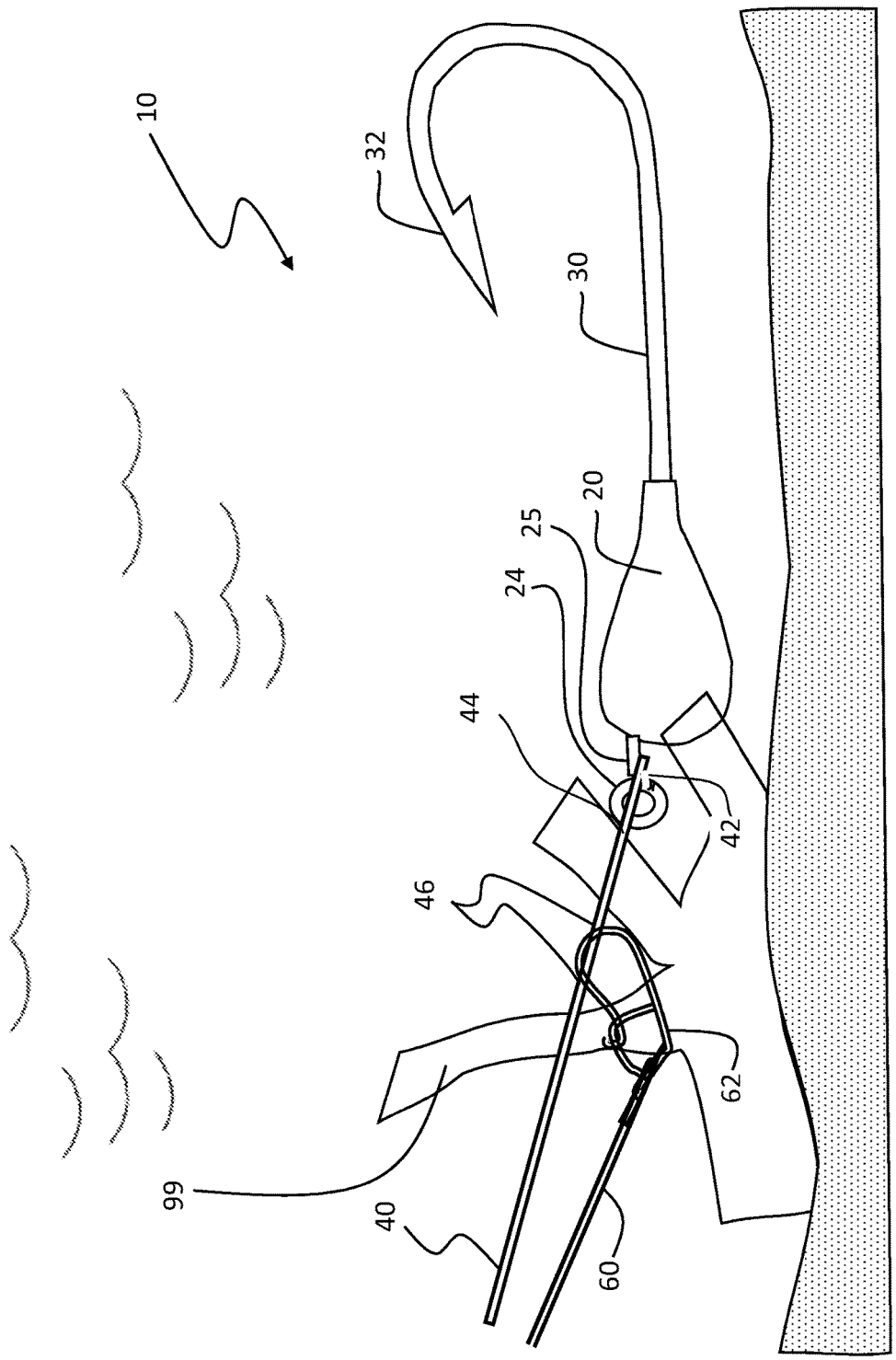
—FIG. 21—

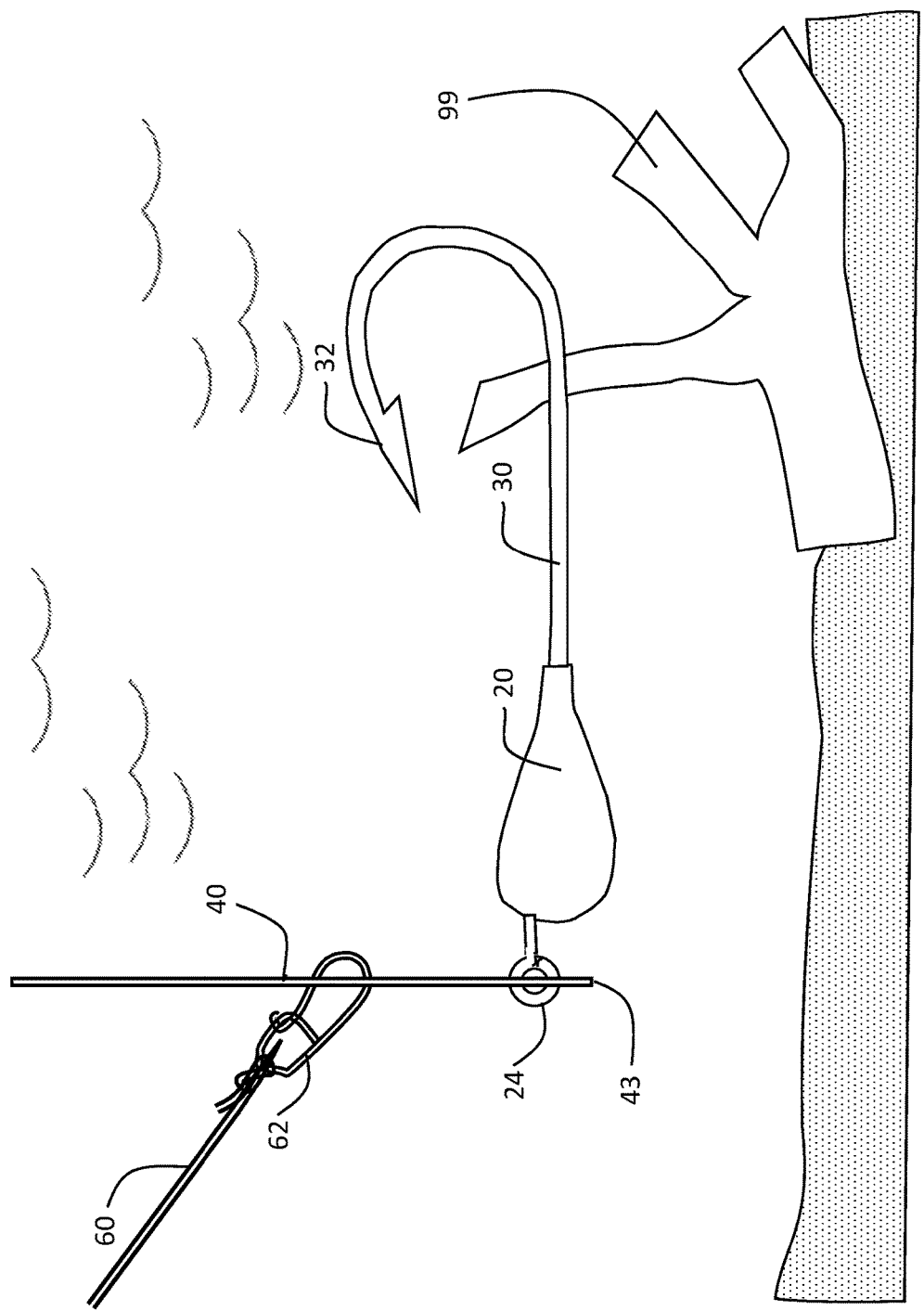

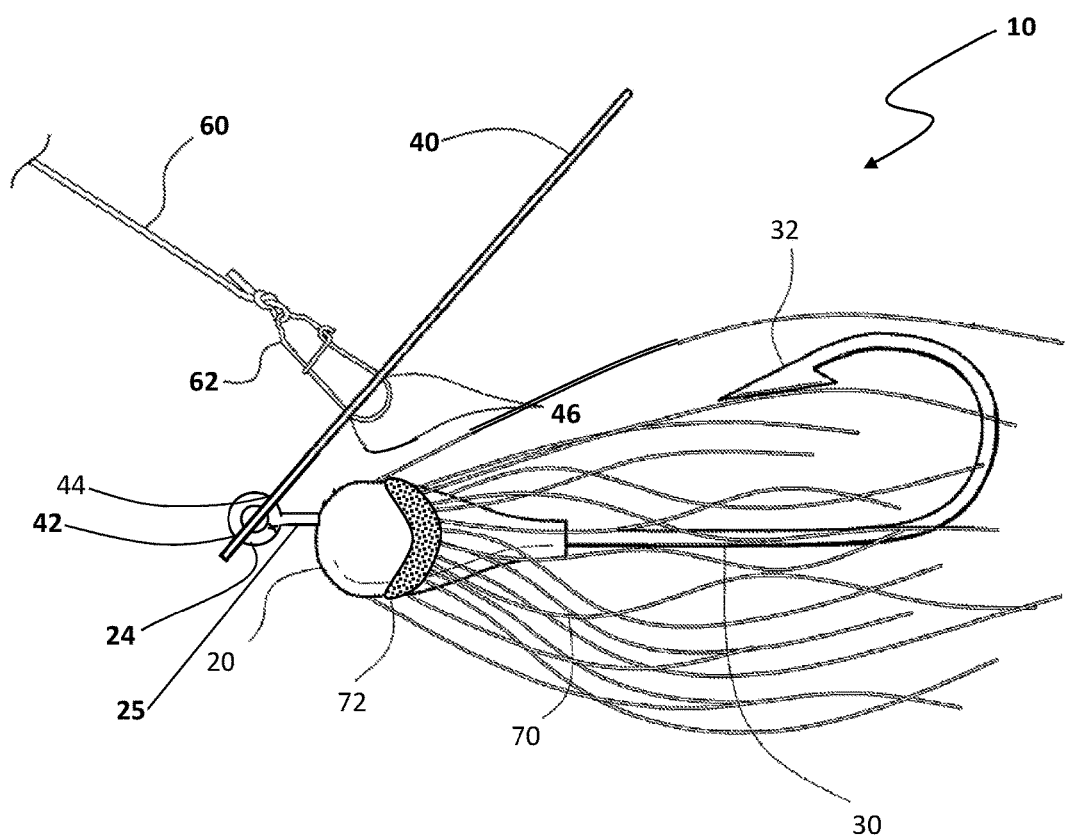
—FIG. 23—

SNAG-RESISTANT FISHING LURE

TECHNICAL FIELD

The present invention relates generally to a snag-resistant bladed fishing lure and, more particularly, to a fishing lure with a blade that is attached directly to the jig (weighted hook) at two attachment points to stabilize the jig and to prevent rollover.

BACKGROUND

One type of fishing lure favored by many anglers is a bladed jig type of lure, which includes a weighted jig body from which a hook extends and to which a blade is attached opposite the hook. The purpose of the blade, among other things, is to move side-to-side to provide the lure with heavy vibration and to shelter the jig body and prevent the hook from being snagged on an underwater obstacle, such as grass or a branch. If the lure becomes snagged, the angler may seek to dislodge it forcefully from the obstacle, but such efforts to retrieve the lure scare away the fish, reducing the likelihood of a successful catch. Further, if the fishing line breaks during the struggle to free the snagged lure, the lure can be lost.

The attachment mechanism for securing the blade to the jig body affects the movement of the blade, as the fishing lure is pulled through the water. The blade is typically provided with a single attachment hole through which a wire loop, or eyelet, extending from the jig body is positioned. One or more intermediate rings may also be used between the wire loop and the blade. In lures of this type, the blade edge proximate the jig body is positioned within the wire loop (or the intermediate ring). The proximity of the attachment hole to the blade edge, the size of the attachment hole in comparison with the outer diameter of the wire loop, and the distance between the attachment hole and the jig body affect the range of the side-to-side motion of the blade over the jig body. The bigger the inside diameter of the wire loop, the more side-to-side movement the blade exhibits.

It has been found that the freedom of movement of the blade associated with connecting the eyelet or wire loop through a single attachment hole can result in an unacceptable amount of "play" between the blade and the weighted jig body. The use of an intermediate ring increases the play in the fishing lure. If there is too much play, the fish may not fully engage the hook and may evade being caught. Many bladed lures with a single attachment point exhibit a 270-degree up-and-back motion, which creates the potential for the jig body to roll over as it passes over an obstacle. This rollover can lead to snagging.

Because of the aggravation associated with snagging and potentially losing a bladed lure, most fishermen choose not to fish these lures in regions known to have heavy cover (that is, areas with ample branches or thick vegetation), where fish tend to congregate. Instead, fisherman position their lures to be above or around the heavy cover area.

Since the fish gather in heavy cover areas, a bladed fishing lure that could navigate through heavy cover without experiencing jig body and hook rollover would reduce the risk of snagging and, therefore, would be highly advantageous.

Thus, the fishing experience would be improved by a fishing lure that has a controlled amount of up-and-back blade movement to promote firm engagement of the fish and to resist snagging by preventing rollover of the jig body.

SUMMARY

A fishing lure includes a jig having a body, a hook, and a blade attached to the body at two attachment points. The hook extends along a longitudinal axis of the body. A fixed wire loop extends from a forward end of the body along the longitudinal axis to directly connect the blade to the body. The blade has an edge near the body, a first attachment hole through the blade near the first edge, a second attachment hole aligned with and spaced near the first attachment hole, and a pair of line attachment holes spaced apart from the second attachment hole. The wire loop is fed directly through both the first and the second attachment holes, and the first edge is outside the wire loop. This arrangement controls the jig body's movement relative to the blade, reducing the likelihood of rollover that could lead to snagging.

More specifically, a fishing lure includes: a jig having a body with a longitudinal axis; a hook extending from the body along the longitudinal axis; a fixed wire loop extending from a forward end of the body along the longitudinal axis; and a blade having a first edge proximate to the body, a first attachment hole through the blade proximate to the first edge, a second attachment hole aligned with and spaced proximate to the first attachment hole, and a pair of line attachment holes spaced apart from the second attachment hole; wherein the wire loop is fed directly through both the first attachment hole and the second attachment hole, and the first edge is outside the wire loop.

BRIEF DESCRIPTION OF THE DRAWINGS

The details of the present invention, both as to its structure and its operation, can be understood with reference to the accompanying figures. It should be noted that these figures are not necessarily to scale in all instances.

FIG. 1 is an overhead plan view of a fishing lure of the present disclosure, according to one aspect provided herein;

FIG. 2 is an overhead plan view of a first embodiment of a blade, which may be used with the fishing lure of FIG. 1, according to the present disclosure;

FIG. 3 is a cross-sectional side view of the blade of FIG. 2;

FIG. 4 is a side view of the fishing lure of FIG. 1;

FIG. 5 is an overhead plan view of a second embodiment of a blade, which may be used with the fishing lure of FIG. 1;

FIG. 6 is a cross-sectional side view of the blade of FIG. 5;

FIG. 7 is a side view of the fishing lure of FIG. 1 with the blade of FIG. 5;

FIG. 8 is an overhead plan view of a third embodiment of a blade, which may be used with the fishing lure of FIG. 1;

FIG. 9 is an overhead plan view of a fourth embodiment of a blade, which may be used with the fishing lure of FIG. 1;

FIG. 10 is a cross-sectional side view of the blade of FIG. 8 and a wire loop as aligned for installation in the blade;

FIG. 11 is a cross-sectional side view of the blade of FIG. 8 and the wire loop of FIG. 10, in an intermediate stage of blade installation;

FIG. 11A is a plan view of a top surface of the blade of FIG. 8 and the wire loop of FIG. 10, in an intermediate stage of blade installation;

FIG. 11B is a plan view of a bottom surface of the blade of FIG. 8 and the wire loop of FIG. 10, in an intermediate stage of blade installation;

FIG. 12 is a cross-sectional side view of the blade of FIG. 8 and the wire loop of FIG. 10, showing the attachment of the blade and the wire loop;

FIG. 13 is an overhead plan view of a fifth embodiment of the blade, which may be used with the fishing lure of FIG. 1;

FIG. 14 is an overhead plan view of a fishing lure having the blade of FIG. 13, illustrating a first range of side-to-side motion of the blade;

FIG. 15 is an overhead plan view of a sixth embodiment of the blade, which may be used with the fishing lure of FIG. 1;

FIG. 16 is an overhead plan view of a fishing lure having the blade of FIG. 15, illustrating a second range of side-to-side motion of the blade;

FIG. 17 is an overhead plan view of a seventh embodiment of the blade, which may be used with the fishing lure of FIG. 1;

FIG. 18 is an overhead plan view of a fishing lure having the blade of FIG. 17, illustrating a third range of side-to-side motion of the blade;

FIG. 19 is a side view of the present fishing lure, illustrating a range of back-and-forth motion of the blade;

FIG. 20 is a side view of the present fishing lure with the blade in a neutral position, as being drawn toward an underwater obstacle;

FIG. 21 is a side view of the present fishing lure, as encountering the underwater obstacle with the blade in a forward position;

FIG. 22 is a side view of the present fishing lure, in which the blade has returned to a neutral position after having encountered the underwater obstacle;

FIG. 23 is a side view of the present fishing lure, in which a hook skirt is attached to the jig body.

DETAILED DESCRIPTION

Reference will now be made in detail to the presently preferred embodiments of the invention, one or more examples of which are illustrated in the figures. Each example is provided by way of explanation and is not meant to be a limitation of the claimed subject matter. For example, features illustrated or described as part of one embodiment may be used with a different embodiment to yield yet still another embodiment. It is intended that the present application include such modifications and variations as come within the scope and spirit of the present disclosure. Selected combinations or aspects of the disclosed technology correspond to a plurality of different embodiments of the present invention. Certain features may be interchanged with similar devices or different features not expressly mentioned that perform the same or similar functions.

As used herein, the singular forms of "a," "and," and "the" include plural versions, unless the context clearly dictates otherwise.

FIG. 1 illustrates an overhead view of a fishing lure 10, according to one aspect of the present disclosure. The fishing lure 10 includes a weighted jig body 20 from which a hook 30 extends along a centerline $C_L$ drawn through the jig body 20. The hook 30 includes one or more hook barbs 32 for engaging the mouth of a fish. At the forward end of the jig body 20, a wire loop 24 or eyelet is fixedly attached along the centerline $C_L$ to directly secure a blade 40 to the jig body 20. The blade 40 includes a first attachment hole 42 proximate to the jig body 20, a second attachment hole 44 in close proximity to the first attachment hole 42, and a pair of line attachment holes 46 spaced apart from the second attachment hole 44.

Significantly, and as will be illustrated in several other figures, the wire loop 24 is positioned through both the first attachment hole 42 and the second attachment hole 44, which limits the back-and-forth motion of the blade 40 over the jig body 20 and, in turn, reduces the amount of play between the blade 40 and the jig body 20. Because of the attachment of the blade 40 at two points (holes 42, 44) rather than a single attachment location, the blade 40 and the jig body 20 tend to work as a unit, thereby reducing the likelihood of rollover and the risk for snagging during use. When a fish bites or when an underwater obstruction is encountered—events which cause the blade to be pulled forward within a 180-degree arc (as in FIG. 19)—the two points of connection between the blade 40 and the jig body 20 prevent the weighted jig body 20 from rolling over.

FIGS. 2 and 3 illustrate an exemplary blade 40a, as may be used with the fishing lure 10 of FIG. 1. The blade 40a has a blade body 41 made of a thin sheet of metal or other suitable rigid material. The blade body 41 generally has the shape of a shield with an edge 43 that, in the example, is perpendicular to a longitudinal axis 50 of the blade; a pair of arcuate or angled sides 47 that converge toward one another; and a tip 49 defined at the intersection of the arcuate sides 47 along the longitudinal axis 50. In addition to the longitudinal, or major, axis 50, the blade 40a may have a transverse, or minor, axis 52 that is perpendicular to the longitudinal axis 50 and that bisects the length of the blade 40a. While the edge 43 is parallel to the transverse axis 52, it should be noted that the edge 43 may instead be concave (curved toward the tip 49) or convex (curved away from the tip 49).

While the exemplary embodiments shown in the present application include a blade 40 having a shield shape, other blade shapes may instead be used. Blades 40 having shapes that are wider at the blade edge 43 and narrower opposite the blade edge 43 tend to perform well. The tip 39 of the blade 40 may be rounded or square, instead of pointed. The shape of the blade 40 determines the surface area of the water to be disrupted, and the weight of the jig body 20 is selected to balance the surface area.

The blade 40a includes the first attachment hole 42 in closest proximity to the blade edge 43 and the second attachment hole 44 adjacent to the first attachment hole 40. The distance between the second attachment hole 44 and the blade edge 43 may be described as a length L1. The line attachment holes 46 are positioned in close proximity to one another and are spaced apart from the second attachment hole 44. All of the holes 42, 44, 46 are positioned along the longitudinal axis 50 or in close proximity to the longitudinal axis 50. As shown in FIG. 3, the holes 42, 44, 46 are punched through the width of the blade 40a.

The position of the line attachment holes 46 toward the center of the blade 40a and/or on the same half of the blade 40a as the attachment holes 42, 44 causes the fishing lure 10 fitted with such blade 40a to dive or plane downward, as the fishing lure 10 is drawn through the water. As shown in FIG. 4, a fishing line 60 may be connected to the blade 40a using a snap fastener 62 that fits through the line attachment holes 46.

As described above and as shown in FIG. 4, the wire loop 24 is positioned through the first attachment hole 42 and the second attachment hole 44, such that the blade edge 43 is outside the wire loop 24. The wire loop 24 may include a stem 25 that connects the wire loop 24 to the jig body 20. The stem 25 may be located at the top of the jig body 20 (i.e., at a plane parallel to and above the plane in which the hook 30 resides) and may be parallel to the hook 30. Alternately, the stem 25 may be angled upward relative to the hook 30.

FIGS. 5 and 6 illustrate an exemplary blade 40b, as may be used with the fishing lure 10 of FIG. 1. The blade 40b includes the generally shield-shaped body 41 as used with the blade 40a, which includes the edge 43 and the arcuate sides 47 that converge at the tip 49. The attachment holes 42, 44 are positioned near the edge 43 along the longitudinal axis 50, as above. However, the line attachment holes 46 are positioned on the opposite half of the blade 40b between the transverse axis 52 and the blade tip 49.

The position of the line attachment holes 46 toward the tip 49 of the blade 40b and/or on the opposite half of the blade 40b as the attachment holes 42, 44 causes the fishing lure 10 fitted with such blade 40b to rise or plane upward, as the fishing lure 10 is drawn through the water. As shown in FIG. 7, the fishing line 60 may be connected to the blade 40b using the snap fastener 62 that fits through the line attachment holes 46. Again, the blade edge 43 is external to the first and second attachment holes 42, 44.

Like the blades 40a and 40b, the blades 40c, 40d of FIGS. 8 and 9 have a generally shield-shaped profile with the blade edge 43, the pair of arcuate sides 47 that converge at the tip 49, the longitudinal axis 50 through the first attachment hole 42 and the second attachment holes 54, 56, and a transverse axis 52 that bisects the arcuate sides 47 in perpendicular relationship to the longitudinal axis 50. The blades 40c, 40d also include the pair of line attachment holes 46 positioned along the longitudinal axis 50. In these exemplary blades 40c, 40d, the line attachment holes 46 are disposed between the transverse axis 52 and the blade tip 49, although the line attachment holes 46 may be positioned at some other location along the longitudinal axis 50.

In FIG. 8, the second attachment hole 54 of the blade 40c is a compound hole having two different hole diameters, D1 (which is the same diameter as the first attachment hole 42) and D3 (which is larger than the diameter D1). The collective length of the second attachment hole 54 is at least slightly larger than the outer diameter of the wire loop 24. The second attachment hole 54 is disposed along the longitudinal axis 50 in proximity to the first attachment hole 42.

The second attachment hole 54 may be arranged with the larger diameter (D3) portion in proximity to the first attachment hole 42, as shown, or may be arranged with the larger diameter (D3) portion distal to the first attachment hole 42. Providing the second attachment hole 54 with two different hole diameters permits installation of the wire loop 24 (as shown in FIGS. 10 through 12). The diameter of the second attachment hole 44, which defines a gap around the wire loop 24, permits a greater degree of side-to-side motion of the blade 40c, as compared to a smaller second attachment hole 44, when the blade 40c is pulled through the water.

FIG. 9 illustrates a blade 40d, in which the second attachment hole 56 has a slot shape with a width D1 and a length D4. The width D1 is the same diameter as the first attachment hole 42. The slot length D4 is at least slightly larger than the outer diameter of the wire loop 24, so that the wire loop 24 may be positioned through the slot-shaped hole 56 and the blade 40d snapped into position, as shown in FIGS. 10-12.

FIG. 10 illustrate a first step in connecting the blade 40c (or 40d) to the wire loop 24. The wire loop 24 is fixedly attached to a forward end of the jig body 20 (not shown in FIG. 11A) by the stem 25. The intermediate circular portion of the wire loop 24 (between the stem 25 and a distal end 26) may define a single 360-degree circle or may resemble a split ring in which the distal end 26 wraps beyond the stem 25 (greater than 360-degrees). The wire loop 24 is positioned over the second attachment hole 54 (or 56), as shown in FIG. 11A, and moved in a downward direction into the second attachment hole 54.

In FIG. 11, as the wire loop 24 is pulled toward the blade edge 43 with a twisting motion, the split ring of the wire loop 24 (i.e., the distal end from the intermediate portion 24) separates, as shown in FIG. 11B, so that the distal end 26 of the wire loop 24 snaps into the first attachment hole 42. Alternately, or in addition, the blade 40c may be twisted and pulled relative to the wire loop 24 attached to the body 20. The assembly of the blade 40c to the wire loop 24 requires the stem 25 to remain above the back surface of the blade 40c.

As shown in FIG. 12, the wire loop 24 is disposed through both the first attachment hole 42 and the second attachment hole 54 (or 56). The blade edge 43 is located outside the wire loop 24, and the stem 25 is disposed above the blade edge 43. Because the end 26 of the wire loop 24 is turned under the stem 25 of the wire loop 24, the configuration reduces the likelihood that the fishing lure 10 will be snagged by underwater grasses, causing the fishing lure 10 to be lost. Additionally, by turning the wire loop 24 under, the likelihood that the wire loop 24 will open during use and the jig body 20 will be lost is reduced.

FIGS. 13 and 14 illustrate a blade 40e, in which the first attachment hole 42 and the second attachment hole 44 have the same diameter D1, and the side-to-side movement of the blade 40e. The blade 40e has a generally shield-shaped profile that includes the blade edge 43, the pair of arcuate sides 47 that converge at the tip 49, and the pair of line attachment holes 46 aligned with the first attachment hole 42 and the second attachment hole 44. The wire loop 24 is made from wire having a gauge approximating and only slightly smaller than the diameter D1, thus substantially filling the first attachment hole 42 and the second attachment hole 44.

As shown in FIG. 14, the blade 40e is permitted to traverse side-to-side over a limited range R1, relative to the centerline $C_L$. If the wire loop 24 strikes the perimeter of the second attachment hole 44, a clacking noise may be produced, which may attract the fish.

FIGS. 15 and 16 illustrate a blade 40f, in which the first attachment hole 42 has a first diameter D1 and the second attachment hole 44 has a second diameter D2 that is larger than the first diameter D1. As shown in FIG. 16, the blade 40f is permitted to traverse side-to-side over a range of motion R2, relative to the centerline $C_L$, which is larger than the range R1. The wire loop 24 strikes the perimeter of the second attachment hole 44, as the fishing lure 10 is pulled through the water, making a clacking noise that may attract the fish.

FIGS. 17 and 18 illustrate a blade 40g, in which the first attachment hole 42 has a first diameter D1 and the second attachment hole 44 has a third diameter D3 that is larger than the second diameter D2 and the first diameter D1. As shown in FIG. 18, the blade 40g is permitted to traverse side-to-side over a range of motion R3, relative to the centerline $C_L$, which is larger than the range R2. The wire loop 24 is free to strike the perimeter of the second attachment hole 44, as the fishing lure 10 is pulled through the water, making a clacking noise that may attract the fish. Although the second attachment hole 44 shown in FIG. 17 is circular, the keyhole-shaped hole 54 of FIG. 8 or the slot-shaped hole 56 of FIG. 9 may instead be used.

FIG. 19 illustrates the up-and-back motion of the blade 40 over the jig body 20 of the fishing lure 10. Because the wire loop 24 is disposed through the two attachment holes 42, 44 of the blade, the blade 40 is permitted to move up-and-back over a range of motion R4 of approximately 180 degrees (±10 degrees), as long as the wire loop 24 fits within the first and second attachment holes 42, 44. The wire loop 24 and the blade edge 43 are positioned to first engage an underwater obstacle 99, as shown in FIGS. 20 and 21, thereby reducing the likelihood that the fishing lure 10 will roll over and become snagged.

FIG. 20 illustrates the fishing lure 10 as being pulled by a fishing line 60 connected to the blade 40, via a snap fastener 62 through the line attachment holes 46. The blade 40 is oriented in a neutral, generally upright position. The hook 30 is oriented in an upright position, such that the barb 32 is disposed directly over the centerline of the fishing lure 10. In a neutral position, the fishing lure 10 moves forward in a generally straight line (without veering left or right) and maintains its lateral position in the water (without diving or rising).

As shown in FIG. 21, when the fishing lure 10 contacts the underwater obstacle 99 (such as a branch), the blade 40 pitches forward. As the fisherman continues to draw the fishing lure 10 through the water, the blade 40 prevents the jig body 20 and the hook 30 from becoming entangled in the underwater obstacle 99. Additionally, the connection of the blade 40 to the wire loop 24 through two attachment holes 42, 44 ensures that the jig body 20 remains in an upright position without rolling over. If the jig body 20 or the hook 30 were to roll over, the hook 30 may become snagged on the underwater obstacle 99, which could cause the fisherman to lose the fishing lure 10.

FIG. 22 illustrates the fishing lure 10, after the fishing lure 10 has cleared the underwater obstacle 99. The blade 40 returns to the neutral (upright) position, and the hook 30 remains upright with the barb 32 over the centerline of the fishing lure 10.

Optionally, shown in FIG. 23, the jig body 20 may be provided with a skirt 70 of thin, flexible members or strips that are attached to the jig body 20 by a collar 72. The skirt 70 may help to disguise the hook 30 from the fish.

As disclosed herein, the present disclosure provides a snag-resistant bladed lure that includes a blade configured to protect the hook and prevent snagging upon an obstacle. The side-to-side movement of the blade is controlled by the two attachment points at which the blade is attached to the jig, the respective size of the two attachment holes, and the gauge of the wire loop. Because the blade is coupled to the jig body at two points, the blade and the jig body tend to work as a unit, thereby minimizing the risk of rollover that may lead to the lure being snagged by an underwater hazard.

While preferred embodiments of the present fishing lure have been shown and described, modifications and variations may be made thereto without departing from the spirit and scope of the present disclosure. Thus, it should be understood that various embodiments may be interchanged, both in whole or in part. Furthermore, those with skill in this technology will appreciate that the foregoing description is by way of example only and is not intended to be a limitation of the invention as further described in the appended claims.

What is claimed is:

1. A fishing lure comprising:
    a jig having a weighted body with a jig longitudinal axis and a hook extending from the body along the jig longitudinal axis, the jig longitudinal axis being located in a first horizontal plane;
    a wire loop having a fixed stem extending from a forward end of the body in a second horizontal plane above the first horizontal plane, an intermediate circular portion connected to the fixed stem, and a distal end; and
    a blade comprising a first edge proximate to the body, a blade tip distal to the first edge, a transverse axis bisecting the blade between the first edge and the blade tip, a first attachment hole through the blade proximate to the first edge, a second attachment hole axially aligned with and spaced proximate to the first attachment hole, and a line attachment;
    wherein the first attachment hole and the second attachment hole are disposed between the first edge and the transverse axis, and wherein the second attachment hole is disposed between the first attachment hole and the transverse axis;
    wherein the first attachment hole has a first diameter, and the second attachment hole has a second diameter, the first diameter being smaller than the second diameter;
    wherein the intermediate circular portion extends directly through both the first attachment hole and the second attachment hole; and
    wherein the fixed stem is sufficiently long that, during lure retrieval as the blade moves in a side-to-side motion, the side-to-side motion is limited by the intermediate circular portion contacting a first hole edge defining the first attachment hole or a second hole edge defining the second attachment hole rather than by contacting the weighted body.

2. The fishing lure of claim 1, wherein the blade has an up-and-back motion over a range of substantially 180 degrees during lure retrieval.

3. The fishing lure of claim 1, wherein the line attachment of the blade further comprises a pair of line attachment holes disposed between the transverse axis and the blade tip.

4. The fishing lure of claim 1, wherein the fixed stem is attached to the body on a first side of the blade, the intermediate circular portion extends through the first attachment hole and the second attachment hole, and the distal end is wrapped beyond the stem, such that the distal end is disposed on a second side of the blade.

5. A fishing lure comprising:
    a jig having a weighted body with a longitudinal axis and a hook extending from the body along the longitudinal axis;
    a fixed wire loop extending from a forward end of the body along the longitudinal axis; and
    a blade comprised of a thin metal sheet and having a first edge proximate to the body, a first attachment hole through the blade proximate to the first edge, a second attachment hole aligned with and spaced proximate to the first attachment hole, and a pair of line attachment holes spaced apart from the second attachment hole, wherein the second attachment hole is positioned between the first attachment hole and the pair of line attachment holes along a longitudinal axis of the blade;
    wherein the first attachment hole has a first hole edge and a first diameter, and the second attachment hole has a second hole edge and a second diameter, the first diameter being smaller than the second diameter;
    wherein the wire loop is fed directly through both the first attachment hole and the second attachment hole, and the first edge is outside the wire loop, such that, during retrieval, the blade oscillates in a side-to-side motion about the wire loop, the side-to-side motion being defined by the wire loop striking at least one of the first hole edge defining the first attachment hole and the second hole edge defining the second attachment hole.

6. The fishing lure of claim 5, wherein the wire loop comprises a stem attached to the body, an intermediate circular portion, and a distal end wrapped alongside the intermediate circular portion.

7. The fishing lure of claim 6, wherein the stem is attached to the body on a first side of the blade, the intermediate circular portion extends through the first attachment hole and the second attachment hole, and the distal end is wrapped beyond the stem, such that the distal end is disposed on a second side of the blade.

8. The fishing lure of claim 5, wherein the blade has an up-and-back motion over a range of substantially 180 degrees during retrieval.

9. The fishing lure of claim 5, wherein the side-to-side motion of the blade occurs over a range determined by the first diameter, the second diameter, and a gauge of the wire loop.

10. The fishing lure of claim 5, wherein the blade comprises a shield shape having a curved second edge and a curved third edge, the second edge and the third edge extending from the first edge and intersecting one another at a blade tip; and wherein the longitudinal axis of the blade extends through the first edge to the blade tip.

11. The fishing lure of claim 10, wherein the blade has a blade length between the first edge and the tip and a transverse axis perpendicular to the longitudinal axis of the blade, the transverse axis bisecting the blade along the blade length.

12. The fishing lure of claim 11, wherein the pair of line attachment holes is disposed between the transverse axis and the blade tip.

13. The fishing lure of claim 5, wherein the blade has a blade tip distal to the first edge and a transverse axis perpendicular to the longitudinal axis of the blade, the transverse axis bisecting a blade length defined between the blade tip and the first edge; and wherein the first attachment hole and the second attachment hole are disposed between the first edge and the transverse axis of the blade.

* * * * *